United States Patent
Boudouris et al.

(10) Patent No.: US 7,338,573 B2
(45) Date of Patent: *Mar. 4, 2008

(54) MAGNETIC SUBSTRATES WITH HIGH MAGNETIC LOADING

(75) Inventors: Randall Boudouris, Sylvania, OH (US); Raymond Richards, Toledo, OH (US)

(73) Assignee: MagnetNotes, Ltd., Toledo, OH (US)

( * ) Notice: Subject to any disclaimer, the term of this patent is extended or adjusted under 35 U.S.C. 154(b) by 186 days.

This patent is subject to a terminal disclaimer.

(21) Appl. No.: 10/274,189

(22) Filed: Oct. 18, 2002

(65) Prior Publication Data

US 2003/0077465 A1    Apr. 24, 2003

Related U.S. Application Data

(63) Continuation-in-part of application No. 09/990,109, filed on Nov. 21, 2001, now Pat. No. 7,128,798.

(60) Provisional application No. 60/253,191, filed on Nov. 26, 2000.

(51) Int. Cl.
  *B29C 47/00* (2006.01)
  *H01F 1/00* (2006.01)
(52) U.S. Cl. .................. 156/244.11; 156/272.4; 156/244.24; 156/244.17; 264/176; 427/450; 427/498; 427/130
(58) Field of Classification Search .......... 156/244.11, 156/244.16, 244.17, 244.23, 244.24, 272.4, 156/314, 315
See application file for complete search history.

(56) References Cited

U.S. PATENT DOCUMENTS 2,690,206 A   9/1954  Mueller ............... 156/501
2,944,586 A   7/1960  Yanulis ............... 156/498
3,033,707 A * 5/1962  Chervenak et al. ...... 428/215

(Continued)

FOREIGN PATENT DOCUMENTS

CA    2210174    1/1998

(Continued)

OTHER PUBLICATIONS

"Roll Coating" by R.T. Schorenberg, Modern Plastic Encyclopedia, 1984-1985, pp. 202-203.
Coatings Technology Handbook, 2nd Edition, Satas and Tracton, Marcel DeUer, Inc. 2001, pp. 129-206.
Bostik, High Performance Poliymers, http://www.industrypackaging.com/packaging/us/Bostic/High_Performance_Polymers_Adhesives/199_0/g_supplier_5.thml; pp. 4-6.

(Continued)

*Primary Examiner*—Richard Crispino
*Assistant Examiner*—Barbara J. Musser
(74) *Attorney, Agent, or Firm*—Vidas, Arrett & Steinkraus, P.A.

(57) ABSTRACT

A method of forming a magnetic assembly having at least one magnetic layer having dimensions of thickness, width and length, and at least one printable substrate layer having dimensions of thickness, width and length, including the steps of providing a molten magnetic composition including about 70 wt-% to about 95 wt-% of at least one magnetic material and about 5 wt-% to about 30 wt-% of at least one thermoplastic binder, forming the magnetic composition into a magnetic layer at an elevated temperature and directly applying the magnetic layer at an elevated temperature to a first surface of a printable substrate layer wherein. An adhesion promoting composition may be further provided between the magnetic layer and the printable substrate layer for improving adhesion between the magnetic layer and the printable substrate layer.

19 Claims, 12 Drawing Sheets

U.S. PATENT DOCUMENTS

| | | | |
|---|---|---|---|
| 3,117,092 A | 1/1964 | Parker | 252/62.5 |
| 3,221,315 A | 11/1965 | Brown, Jr. et al. | 340/174.1 |
| 3,470,055 A | 9/1969 | Wade | 156/244.27 |
| 3,616,191 A * | 10/1971 | Fuerholzer et al. | 428/339 |
| 3,867,299 A | 2/1975 | Rohatgi | 252/62.54 |
| 4,022,701 A | 5/1977 | Sawa et al. | 252/62.54 |
| 4,128,386 A * | 12/1978 | Wissinger et al. | 425/462 |
| 4,140,463 A * | 2/1979 | Brinkmann et al. | 425/377 |
| 4,234,378 A | 11/1980 | Iwasaki et al. | 162/138 |
| 4,310,978 A | 1/1982 | Stern | 40/600 |
| 4,388,349 A | 6/1983 | Korpman et al. | 427/208.4 |
| 4,455,184 A | 6/1984 | Thompson | 156/244.11 |
| 4,479,838 A | 10/1984 | Dunsirn et al. | 156/247 |
| 4,588,209 A | 5/1986 | Zebrowski et al. | 281/45 |
| 4,621,837 A | 11/1986 | Mack | 283/105 |
| 4,857,594 A | 8/1989 | Lakshmanan et al. | 525/98 |
| 4,941,935 A | 7/1990 | Gregory | 156/243 |
| 4,944,802 A | 7/1990 | Chagnon et al. | 106/20 |
| 4,996,110 A | 2/1991 | Tanuma et al. | 428/343 |
| 5,002,677 A | 3/1991 | Srail et al. | 252/62.54 |
| 5,019,436 A | 5/1991 | Schramer et al. | 428/40 |
| 5,114,517 A | 5/1992 | Rippingale et al. | 56/187 |
| 5,194,299 A | 3/1993 | Fry | 427/208.6 |
| 5,397,843 A | 3/1995 | Lakshmanan et al. | 525/240 |
| 5,458,282 A | 10/1995 | Martin | 229/92.8 |
| 5,478,891 A | 12/1995 | Lakshmanan et al. | 525/240 |
| 5,482,982 A | 1/1996 | Lakshmanan et al. | 524/68 |
| 5,503,891 A | 4/1996 | Marshall et al. | 428/99 |
| 5,505,620 A | 4/1996 | Bartlett | 434/73 |
| 5,641,116 A | 6/1997 | Martin | 229/92.8 |
| 5,665,429 A | 9/1997 | Elawakil | 427/218 |
| 5,676,307 A | 10/1997 | Martin | 229/92.8 |
| 5,676,791 A | 10/1997 | Christel | 156/79.6 |
| 5,699,956 A | 12/1997 | Brennan | 229/92.8 |
| 5,788,073 A | 8/1998 | Suryk | 335/205 |
| 5,843,329 A | 12/1998 | Deetz | 252/62.54 |
| 5,844,458 A | 12/1998 | Bartholomew et al. | 335/205 |
| 5,868,498 A | 2/1999 | Martin | 383/11 |
| 5,869,148 A | 2/1999 | Silverschotz et al. | 427/549 |
| 5,879,784 A | 3/1999 | Breen et al. | 428/195 |
| 5,891,204 A | 4/1999 | Neff | 51/297 |
| 5,924,624 A | 7/1999 | Martin | 229/71 |
| 5,949,050 A | 9/1999 | Fosbenner et al. | 235/449 |
| 5,983,537 A | 11/1999 | Johnson | 40/124.04 |
| 5,985,435 A | 11/1999 | Czaplicki et al. | 428/323 |
| 5,990,218 A | 11/1999 | Hill et al. | 524/431 |
| 5,994,990 A | 11/1999 | Ogikubo | 335/285 |
| 6,024,277 A | 2/2000 | Martin | 229/71 |
| 6,134,821 A | 10/2000 | Love | 40/600 |
| 6,153,279 A | 11/2000 | Charley | 428/40.1 |
| 6,190,573 B1 | 2/2001 | Ito | 252/62.55 |
| 6,228,933 B1 | 5/2001 | Hiles | 524/590 |
| 6,262,174 B1 | 7/2001 | Cooper et al. | 525/88 |
| 6,304,162 B1 | 10/2001 | Nakatsuka et al. | 335/302 |
| 6,312,795 B1 | 11/2001 | Yamamoto | 428/323 |
| 6,387,485 B1 | 5/2002 | Bielek et al. | 428/343 |
| 6,436,520 B1 | 8/2002 | Yamamoto | 428/220 |
| 6,451,221 B1 * | 9/2002 | Hart et al. | 252/62.54 |
| 6,464,894 B1 | 10/2002 | Antochin et al. | 252/42.54 |
| 6,468,678 B1 | 10/2002 | Dahlin et al. | 428/692 |
| 6,476,713 B1 | 11/2002 | Hiles | 524/439 |
| 6,494,968 B1 | 12/2002 | Hamano et al. | 148/302 |
| 6,596,096 B2 | 7/2003 | Carl et al. | 148/101 |
| 6,693,506 B2 | 2/2004 | Matsumura et al. | 336/200 |
| 6,707,361 B2 | 3/2004 | Blume | 335/296 |
| 6,714,114 B2 | 3/2004 | Matsumura et al. | 336/233 |
| 6,726,781 B2 | 4/2004 | Walmer et al. | 148/303 |
| 6,749,750 B2 | 6/2004 | Barbera-Guillem et al. | 210/222 |
| 6,881,450 B1 | 4/2005 | Texier | 427/550 |
| 2002/0081446 A1 | 6/2002 | Boudouris et al. | |
| 2003/0034869 A1 | 2/2003 | Matsumura et al. | 336/218 |
| 2003/0206091 A1 | 11/2003 | Matsumura et al. | 336/233 |
| 2004/0009370 A1 * | 1/2004 | Abe | 428/693 |
| 2004/0191572 A1 * | 9/2004 | Gao et al. | 428/694 BA |

FOREIGN PATENT DOCUMENTS

| | | |
|---|---|---|
| CN | 1032641 A | 5/1989 |
| DE | 44 41 545 A | 5/1995 |
| DE | 197 39 174 A | 3/1999 |
| EP | 0 315 063 A | 5/1999 |
| EP | 1063659 | 12/2000 |
| GB | 1116861 | 11/1984 |
| GB | 2315367 | 1/1998 |
| JP | 59 170130 A | 9/1984 |
| JP | 63 069204 A | 3/1988 |
| JP | 01 014901 A | 1/1989 |
| JP | 01 131259 A | 5/1989 |
| JP | 01 131260 A | 5/1989 |
| JP | 01 131261 A | 5/1989 |
| JP | 01 131262 A | 5/1989 |
| JP | 02 155738 A | 6/1990 |
| JP | 07-104670 | 4/1995 |
| JP | 07-226318 | 8/1995 |
| JP | 07-250460 | 9/1995 |
| JP | 09-232133 | 9/1997 |
| JP | 09-270318 | 10/1997 |
| JP | 09-315090 | 12/1997 |
| JP | 10-024534 | 1/1998 |
| JP | 10-219003 | 8/1998 |
| JP | 11-121219 | 4/1999 |
| JP | 2000-047343 | 2/2000 |
| JP | 2000-348958 | 12/2000 |
| JP | 2001-006924 | 1/2001 |
| JP | 2001-068337 | 3/2001 |
| JP | 2001-076920 | 3/2001 |
| JP | 2001-115044 | 4/2001 |
| JP | 2001-139704 | 5/2001 |
| JP | 2001-230118 | 8/2001 |
| JP | 2001-250733 | 9/2001 |
| JP | 2001-257111 | 9/2001 |
| JP | 2001-297910 | 10/2001 |
| JP | 2002-099216 | 4/2002 |
| JP | 2002-172737 | 6/2002 |
| JP | 2002-244562 | 8/2002 |
| JP | 2002-329608 | 11/2002 |
| JP | 2002-353025 | 12/2002 |
| JP | 2003-011278 | 1/2003 |
| JP | 2003-045713 | 2/2003 |
| JP | 2003-045714 | 2/2003 |
| JP | 2003-059714 | 2/2003 |
| JP | 2003-068527 | 3/2003 |
| JP | 2003-071978 | 3/2003 |
| JP | 2003-097536 | 4/2003 |
| JP | 2004-029095 | 1/2004 |
| JP | 2004-055992 | 2/2004 |
| SU | 981 325 A | 12/1982 |
| SU | 1 030 386 A | 7/1983 |
| SU | 1 219 611 A | 3/1986 |
| WO | WO 0001776 A1 | 1/2000 |
| WO | (WO01/69612 A2) | 9/2001 |
| WO | 02/42074 A1 | 5/2002 |

OTHER PUBLICATIONS

Bostik, Products, http://www.bostik-us.com/products/index.asp?fa=categories&divisionId=9&categoryId=35; pp. 1-2.

Bostik, Hot melt Adhesives, http://www.bostik-us.com/products/index.asp?fa=subCategories&divisionId=4&categoryId=11&subCategoryId=19; pp. 1-2.

Bostik, Vitel Co-Polyester Resins, http://www.bostik-us.com/products/index.asp?fa=subCategories&divisionId=4&categoryId=11&subCategoryId=24; p. 1.

Bostik, High Performance Poliymers, http://www.industrypackaging.com/packaging/us/Bostic/High_Performance_Polymers_Adhesives/199_0/g_supplier_5.thml; pp. 4-6, no date available.

Bostik, Products, http://www.bostik-us.com/products/index.asp?fa=categories&divisionId=9&categoryId=35; pp. 1-2, no date available.

Bostik, Hot melt Adhesives, http://www.bostik-us.com/products/index.asp?fa=subCategories&divisionId=4&categoryId=11&subCategoryId=19; pp. 1-2, no date available.

Bostik, Vitel Co-Polyester Resins, http://www.bostik-us.com/products/index.asp?fa=subCategories&divisionId=4&categoryId=11&subCategoryId=24; p. 1, no date available.

* cited by examiner

MAGNETIC SUBSTRATES WITH HIGH MAGNETIC LOADING

CROSS-REFERENCE TO RELATED U.S. APPLICATIONS

This is a continuation-in-part of U.S. patent application Ser. No. 09/990,109 filed Nov. 21, 2001 now U.S. Pat. No. 7,128,798 which claims priority from U.S. provisional patent application No. 60/253,191 filed Nov. 26, 2000, both of which are incorporated by reference herein in their entirety.

FIELD OF THE INVENTION

The present invention relates to methods and compositions for making a magnetic, printable assembly that will self-adhere to a magnetically attracted surface, and articles made therefrom.

BACKGROUND OF THE INVENTION

Flexible permanent magnetic materials are often supplied in the form of sheets or rolls and have been commercially available for many years. These materials are typically prepared by mixing a powdered ferrite material with a suitable polymeric or plastic binder into a uniform mixture. The polymeric materials are often elastomers, and the process is therefore typically accomplished through the use of sheet extrusion or calendering. The mixture is converted into strip or sheet form, providing a permanent stable product that is usually somewhat flexible, and that can readily be handled and made into elements of any desired shape by cutting and/or stamping.

The magnetic material is permanently magnetized so that the resulting elements can act individually as permanent magnets, the magnetic field being of sufficient strength that they will adhere to a magnetically attracted surface, such as the surface of an iron or steel sheet, even through a sheet of paper or thin cardboard. Many magnetic materials and the resultant sheet materials are typically inherently dark in color and it is therefore usual to attach these magnets to a printable substrate such as paper or plastic by gluing. It is therefore to the paper or plastic that the decorative pattern and/or other information may be printed. A popular application of such materials is thin, flat magnets having on their outer surface a decorative pattern and/or promotional information, including advertisements in direct mailings, newspaper inserts, and so forth, box toppers, coupons, business cards, calendars, greeting cards, postcards, and so forth.

These magnetic pieces may then be placed on a magnetically attracted surface such as a refrigerator, file cabinet, or other surface where they may be used as reminders and are often used to hold sheets of paper such as notes, recipes, lists, children's artwork, reminders, and so on.

In the usual manufacture of these items, multiple producers are involved in the process. For example, a printer produces the printed matter on wide web presses or individual sheets. If in web form, the web is cut into individual sheets and then shipped to a magnet manufacturer where the magnetic material and the printed matter are joined through the use of an adhesive layer. Alternatively, the printer may purchase or otherwise obtain magnets and then join the printed matter to the magnets through the use of an adhesive layer, or may have both pieces shipped to a third party where the pieces may be joined through the use of an adhesive layer.

There remains a need in the art for an improved magnetic composition which can be applied in such a way that the production process of such flexible magnets can be simplified.

SUMMARY OF THE INVENTION

In general, the present invention relates to methods and compositions for making magnetic, printable assemblies that will self-adhere to a magnetically attracted surface.

In one aspect, the present invention relates to a unitary process of making a magnetic, printable assembly in which at least one magnetic layer may be directly formed and joined to a printable layer without the use of an additional adhesive layer. The adhesion between the magnetic layer and the printable substrate is sufficient so that no additional adhesive is required. The process allows for formation of the magnetic layer and joining of the magnetic layer to a printable substrate during a single process. The formation and joining are accomplished at an elevated temperature sufficient to provide the magnetic layer in pliable or plastic form.

The process may further include a magnetization step which may be accomplished either when the magnetic layer is at an elevated temperature, or when it has cooled to ambient temperatures.

The process involves application of the magnetic layer directly to the printable substrate at elevated temperatures wherein the magnetic layer is pliable and or in a plastic form.

The present invention further relates to improved magnetic compositions which may be employed in the process as described herein. The magnetic layer includes from about 70 wt-% to about 95 wt-% of at least one magnetic material and about 5 wt-% to about 30 wt-% of at least one thermoplastic material. Such compositions may also be employed in other processes as well.

In one embodiment of the present invention, the magnetic material has the general formula $M^{2+}O6Fe_2O_3$ ($MFe_{12}O_{19}$) where M is a divalent metal. Suitably, M is barium, strontium or lead. In some embodiments, the polymeric binder includes at least one amorphous polypropylene.

While the present invention has the advantage that no additional adhesive layer is required, this is not to say that in some embodiments, an adhesive may be advantageously employed. As such, in another aspect, the present invention relates to methods and compositions for promoting or improving the adhesion between a magnetic layer and a printable substrate layer as described in U.S. patent application Ser. No. 09/990,109, the entire content of which has been incorporated by reference herein.

In another aspect, the present invention relates to a method of forming a magnetic assembly having at least one magnetic layer having dimensions of thickness, width aid length, and at least one printable substrate layer having dimensions of thickness, width and length. Applied between the magnetic assembly and the printable substrate layer is an adhesion promoting composition for improving the adhesion between the magnetic layer and the printable substrate layer. This composition may be an adhesive composition, a primer composition, a tie layer, or any such composition know to improve adhesion between two surfaces which is known in the art.

The method includes the steps of providing a magnetic composition including about 70 wt-% to about 95 wt-% of at least one magnetic material and about 5 wt-% to about 30 wt-% of at least one thermoplastic binder, forming the magnetic composition into a magnetic layer at an elevated temperature and directly applying the magnetic layer to a printable substrate layer at an elevated temperature. In some embodiments, an adhesion promoting layer may be provided between the magnetic layer and the printable substrate layer for improving adhesion between the magnetic layer and the printable substrate layer.

The adhesion promoting composition may be provided in any of a variety of ways. The adhesion promoting composition may be applied to the printable substrate layer using any method known in the art. The adhesion promoting composition may be pre-applied to webs or sheets of printable substrate layer prior to running the web or sheet on-line wherein the magnetic layer is applied, or the adhesion promoting composition may be advantageously applied in-line with the magnetic layer. If the adhesive is pre-applied, it may be necessary to provide a release liner until application of the magnetic layer, particularly if the adhesive is a pressure sensitive adhesive, for example.

If the adhesion promoting composition is applied on-line, it may also be applied to the magnetic layer. In one embodiment, the adhesion promoting composition is coextruded with the magnetic composition and both are applied simultaneously to the printable substrate layer at an elevated temperature.

In another embodiment, the magnetic composition may be extruded while the adhesion promoting composition is sprayed either prior to the magnetic composition exiting from the die head, or just after the magnetic composition exits the die head. While coextrusion advantageously employs a thermoplastic adhesion promoting composition, spray application may employ water based and other solvent based compositions as well because the temperature of the composition does not necessarily have to be elevated when using spray applications.

In another embodiment, the adhesion promoting composition is applied using a second die head, nozzle, slot, or the like wherein application of the adhesion promoting composition to the printable substrate layer may occur only seconds prior to application of the magnetic layer.

One of ordinary skill in the art may also describe such an application as occurring only inches or feet before the magnetic composition if describing application to a web of printable substrate layer, for example.

In another embodiment, the adhesion promoting composition is pre-applied to the printable substrate layer. For some adhesion promoting compositions, this may also involve having a release liner over the adhesion promoting composition. For example, if the adhesion promoting composition is a pressure sensitive adhesive, for example, which is sticky or tacky to the touch, a release liner may be required for such a pre-application. Pre-application may refer to only minutes or hours prior to application of the magnetic layer, or it may further involve shipping and/or storage of the printable substrate layer as well.

DETAILED DESCRIPTIONS OF THE PREFERRED EMBODIMENTS

Figure 1:
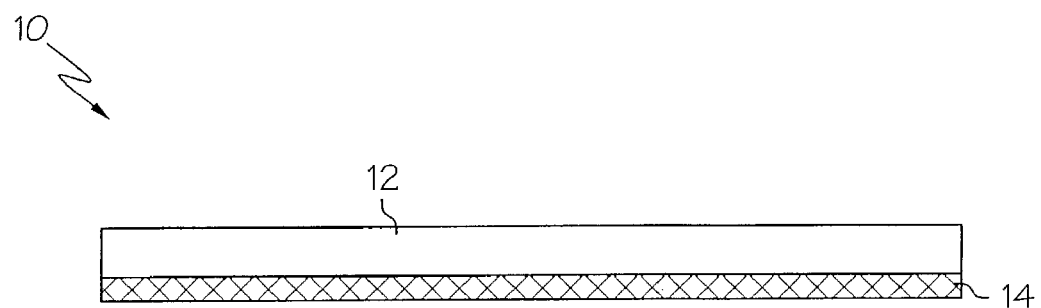
FIG. 1 is a cross-sectional sideview of the magnetic assembly of the present invention.

This invention may be employed in combination with embodiments described in U.S. patent application Ser. No. 09/990,109, the entire content of which has been incorporated by reference herein.

The present invention relates to a novel method of making a printable, magnetic assembly, and to a magnetic composition and articles made therefrom.

The magnetic substrate layer may suitably include about 70 weight % to about 95 weight %, more suitably about 75 wt-% to about 95 wt-%, even more suitably about 75 weight % to about 92 weight %, and most suitably about 80 wt-% to about 90 wt-% of a magnetic material, and suitably about 5 wt-% to about 30 wt-%, more suitably about 5 wt-% to about 25 wt-%, even more suitably about 8 wt-% to about 20 wt-% and most suitably about 10 wt-% to about 15 wt-% of a polymeric binder. The magnetic material is uniformly dispersed in the polymeric binder.

As used herein, the term "magnetic" (when applied to a substrate, article, object, etc.) shall refer to any material which exhibits a permanent magnetic behavior or is readily permanently magnetized.

Magnetic materials which are particularly suitable for use herein include the ferrites having the general formula ($M^{2+}$ $O6Fe_2O_3$) $MFe_{12}O_{19}$ where M represents Ba or Sr.

Other examples of magnetic materials suitable for use herein include a rare earth-cobalt magnet of $RCO_5$ where R is one or more of the rare earth elements such as Sm or Pr, yttrium (Y), lanthanum (La), cerium (Ce), and so forth.

Other specific examples of magnetic materials include, for instance, manganese-bismuth, manganese-aluminum, and so forth.

The method of the present invention is not limited to any particular magnetic material, and the scope of the invention is therefore not intended to be limited as such. While the above described materials find particular utility in the process of the present invention, other materials which are readily permanently magnetized may also find utility herein.

The magnetic composition suitably includes about 70 wt-% or more of the magnetic material as to have a sufficient attractive force for practical uses. However, it is usually impractical to employ more than 95 wt-% of the magnetic material because of production concerns, and also because of the difficulty of retaining more than this in the binder material. Further-more, including more than about 95 wt-% of the magnetic material may lead to a rougher surface. The magnetic material is often supplied in a powder form.

The magnetic strength of the finished product is a function of the amount of magnetic material or powder in the mix, the surface area, thickness, and method of magnetization (e.g. whether it is aligned or not).

The thermoplastic material, often referred to in the industry as a thermoplastic binder, suitable for use in the process of the present invention may include any polymeric material that is readily processable with the magnetic material on, for instance, the thermoplastic or hot melt processing equipment as described in detail below. Such thermoplastic materials include both thermoplastic elastomers and non-elastomers or any mixture thereof.

The thermoplastic composition may be selected based on, for one, the type of printable substrate which is being used, and the adhesion obtained between the thermoplastic composition and the printable substrate.

Examples of thermoplastic elastomers suitable for use herein include, but are not limited to, natural and synthetic rubbers and rubbery block copolymers, such as butyl rubber, neoprene, ethylene-propylene copolymers (EPM), ethylene-propylenediene polymers (EPDM), polyisobutylene, polybutadiene, polyisoprene, styrene-butadiene (SBR), styrene-butadiene-styrene (SBS), styrene-ethylene-butylene-styrene (SEBS), styrene-isoprene-styrene (SIS), styrene-isoprene (SI), styrene-ethylene/propylene (SEP), polyester elastomers, polyurethane elastomers, to mention only a few, and so forth and mixtures thereof. Where appropriate, included within the scope of this invention are any copolymers of the above described materials.

Examples of suitable commercially available thermoplastic elastomers such as SBS, SEBS, or SIS copolymers include KRATON® G (SEBS or SEP) and KRATON® D (SIS or SBS) block copolymers available from Kraton Polymers; VECTOR® R (SIS or SBS) block copolymers available from Dexco Chemical Co.; and FINAPRENE® (SIS or SBS) block copolymers available from Atofina.

Some examples of non-elastomeric polymers include, but are not limited to, polyolefins including polyethylene, polypropylene, polybutylene and copolymers and terpolymers thereof such as ethylene vinyl acetate copolymers (EVA), ethylene n-butyl acrylates (EnBA), ethylene methyl (meth) acrylates including ethylene methyl acrylates (EMA), ethylene ethyl (meth) acrylates including ethylene ethyl acrylates (EEA), interpolymers of ethylene with at least one $C_3$ to $C_{20}$ alphaolefin, polvamides, polyesters, polvurethanes, to mention only a few, and so forth, and mixtures thereof. Where appropriate, copolymers of the above described materials also fund utility herein.

Examples of polymers useful herein may be found in U.S. Pat. No. 6,262,174 incorporated by reference herein in its entirety. Polymeric compositions exhibiting high hot tack have been found to be particularly suitable for use herein. Hot tack is a term of art known to those of ordinary skill.

Examples of commercially available non-elastomeric polymers include EnBA copolymers available from such companies as Atofina under the tradename of LOTRYL®, from ExxonMobil under the tradename of ESCORENE®, from Du Pont de Nemours & Co. under the tradename of ELVALOY®; EMA copolymers available from ExxonMobil under the tradename of OPTEMA®; EVA (ethylene vinyl acetate) copolymers are available from Du Pont under the tradename of ELVAX® and from Equistar under the tradename of ULTRATHENE® to name only a few. In one embodiment, the thermoplastic binder includes an ethylene vinyl acetate copolymer. One example of such a copolymer is ELVAX® 210 a 28% vinyl acetate, 400 melt index copolymer available from Du Pont de Nemours & Co.

In some embodiments of the present invention, the binder includes at least one polyolefin or polvalphaolefin, or a copolymer or terpolymer thereof Examples of useful polyolefins include, but are not limited to, amorphous (i.e. atactic) polyalphaolefins (APAO) including amorphous propylene homopolymers, propylene/ethylene copolymers, propylene/butylene copolymers and propylene/ethylene/butylene terpolymers; isotactic polyalphaolefins; and linear or substantially linear interpolymers of ethylene and at least one aipha-olefin including, for instance, ethylene and 1-octene, ethylene and 1-butene, ethylene and 1-hexene, ethylene and 1-pentene, ethylene and 1-heptene, and ethylene and 4-methyl-1-pentene and so forth. In some embodiments, it may be preferable to employ a small amount of another polymer in combination with the polyalphaolefin such as maleic anhydride grafted polymers which have been used to improve wetting and adhesion. Other chemical grafting can be used, but maleic anhydride is by far the most common. Usually only a few percent in grafting (1-5%) are used and most tend to be ethylene or propylene copolymers.

The terms "polyolefin" and "polyalphaolefin" are often used interchangeably, and in fact, are often used interchangeably to describe amorphous polypropylenes (homo-, co- and terpolymers). For a detailed description of such materials, see U.S. Pat. No. 5,482,982, U.S. Pat. No. 5,478,891 and U.S. Pat. Nos. 5,397,843, 4,857,594, each of which is incorporated by reference herein in its entirety.

The term "alpha" is used to denote the position of a substituting atom or group in an organic compound.

As used herein, the terms "copolymer" and "interpolymer" shall be used to refer to polymers having two or more different comonomers, e.g. copolymer, terpolymer, and so forth.

Examples of commercially available amorphous polyolefins suitable for use herein include those available under the tradename of REXTAC® from Huntsman Polymers including polypropylene homopolymers, propylene/ethylene copolymers and propylene-butene copolymers; VESTOPLAST® APAOs available from Hills including homopolymers and copolymers, as well as terpolymers of propylene/ethylene/butene; as well as those available from Rexene and those available under the tradename of EASTOFLEX® from Eastman Chemical Co. in Kingsport, TN.

Examples of copolymers of a polyolefin and at least one alpha-olefin include metallocene catalyzed polyolefins (interpolymers of ethylene and at least one alphaolefin) commercially available from ExxonMobil under the tradename EXXACT®, and from DuPont Dow Elastomers under the tradename ENGAGE®, and from Dow under the tradename AFFINITY®.

In one particular embodiment, the binder is an amorphous polyalphaolefin available from Eastman Chemical Co. under the tradename of EASTOFLEX®. Amorphous polyalphaolefins when used in combination with the magnetic material have been found to provide excellent adhesion to the printable substrate without the need for further formulation. However, some polymeric materials may require the addition of tackifying resins, plasticizers, and so forth to provide adequate adhesion. The addition of low molecular weight plasticizers and/or tackifying resins can also improve the processability of the composition as well by changing rheological properties and/or lowering the melt viscosity of the composition.

Any of the polymeric materials useful herein may be used in combination with one another. Furthermore, other polymeric materials not specifically described herein also find utility in the present invention. The list described above is intended for illustrative purposes only, and is not intended to limit the scope of the present invention. One of skill in the art would understand that there are vast numbers of polymeric materials available that may find utility herein.

Tackifying resins are available from numerous sources including many of the companies described above, and include, for instance, hydrocarbon tackifying resins such as those available from Eastman Chemical Co. Linder the tradename of EASTOTAC®; ESCOREZ® petroleum hydrocarbon resins available from Exxon Mobil; PICCOTAC® and PICCOLYTE® polyterpene resins available from Hercules; FORAL® hydrogenated rosins and rosin ester resins available from Hercules; WINGTAC® petroleum hydrocarbon resins available from Goodyear; REGALREZ® hydrocarbon resins and REGALITE® hydrogenated aromatic resins available from Hercules Inc.; and so on and so forth.

Plasticizers are available from many sources and include plasticizing oils, for instance. Plasticizing oils are often petroleum based and are available from various petroleum companies.

Waxes may also be optionally added to the compositions to lower the melt viscosity and/or change rheological characteristics.

Other optional ingredients include, but are not limited to, antioxidants, dyes or pigments, UV agents, and so forth. Such optional ingredients are known to those of skill in the art and are typically added in low concentrations which do not adversely affect the physical characteristics of the composition.

The list of materials described above is intended for illustrative purposes only, and is by no means exclusive of the materials which may be employed in the magnetic composition herein, and as such is not intended as a limit on the scope of the invention herein.

The amount of adhesion required between the printable substrate and the magnetic composition will vary depending on application, and on the printable substrate employed. It may be desirable that the magnetic composition have sufficient adhesion to remove fiber from the printable substrate if it is, for instance, paper. Lack of fiber transfer may not always be indicative of poor adhesion however. For instance, a lack of delamination may be adequate as well. For other types of substrates such as fabrics, plastics or metallic substrates it may be desirable that the magnetic layer and printable substrate layer do not pull apart easily, or do not delaminate.

Bond strength between the magnetic layer and the printable substrate may be tested using 180° or 90° peels for instance, as is known in the art. Such methods may be found under the ASTM testing methods. The amount of force required to peel the substrates apart will vary depending on the end use and the printable substrate. For some applications a peel force of about 200 to 400 g/inch is adequate and 400 to 450 g/inch an upper limit, while for some, the peel strengths may be upwards of 1000 to 1500 g/inch or more. For instance, for thermosetting polymeric compositions, peel strengths are up to 1000 or 1500 g/inch or higher.

It is desirable that the resultant magnetic composition have little or no surface tack under ambient temperatures. Some compositions maybe shear rate sensitive exhibiting Bingham plastic flow. In hot melt application, viscosity can be as low as 4000 cps at 300° F. (about 150° C.) or as high as 200,000 cps at 300° F. (about 150° C.). Because temperature is a significant factor, it is not uncommon for extrusion coating to occur at temperatures of as high as about 600° F. to about 650° F. (about 315° C. to about 345° C.) melt temperatures. The temperature at which the magnetic composition is applied to the substrate may be quite different from the temperature inside the extruder.

The magnetic composition after exiting the extruder and the application head, and thus after formation, i.e. shaping, of the magnetic layer, may have cooled to a substantial degree at the time of application of the now formed magnetic layer to the printable substrate layer. However, the magnetic composition should remain at an elevated temperature high enough to achieve an adequate bond between the magnetic layer and the printable substrate layer.

The magnetic material and the thermoplastic binder and/or other ingredients are blended at elevated temperatures using standard thermoplastic mixing equipment such as extruders, Baker Perkins, Banbury mixers, single or twin screw e*tfadefs extruders, Farrell Continuous mixers, and high shear mixing equipment.

The mixture may be compounded and made into a form, such as slats, pellets or any form known in the art suitable for feedstock for extrusion or other melt processing equipment, which is then delivered to the coating company. The coating company may then use a high pressure single screw extruder, or other processing equipment to melt and pressurize the mixture, to force it through an application head such as a slot die, rotary screen head, or other such application head, at the coating station. Thus, the extruder or other hot melt equipment supplies the resultant magnetic composition directly to the application head. During extrusion or other melt processing of the magnetic composition, the temperature may be high enough that the composition is considered to be molten, i.e. in melted or liquid form.

In an alternative embodiment of the present invention, various ingredients may be supplied to the extruder in individual pellets, slats, and so forth. For instance, if more than one thermoplastic binder material is employed, they do not have to be supplied as a mixture already in pellet or slat form. They may each be supplied in pellet or slat form individually, for example.

Coating companies can use a variety of application processes known in the art. Examples of application processes useful in applying the magnetic composition to the printable substrate include, but are not limited to, slot die coating, roll coating or reverse roll coating, knife-over-roll gravure and reverse direct gravure, wire rod coating, air-knife coating, slot-orifice coating, screen printing with a hot screen, and so forth.

In one embodiment of the present invention, slot die coating is used in combination with a single screw extruder.

In another embodiment of the present invention, a method referred to in the industry as flex-o-press is employed. The tern "flex-o-press" as used herein, generally refers to a four roll coating method by which a first roll which is heated, and typically turns at a speed winch is half of the second roll. The second roll carries the thermoplastic/magnetic mixture. A third roll is a roll-plate roll which is a silicone rubberized roll and may have a patterned surface with raised areas for application of the magnetic composition of the present invention to the printable substrate in a predetermined pattern. This roll comes into light contact with the second roll and then transfers the thermoplastic/magnetic mixture to a fourth roll. See Roll Coating by R. T. Schorenberg, Modern Plastic Encyclopedia, 1984-1985, pp. 202-203, which is incorporated herein by reference in its entirety. Another useful reference is Coatings Technology Handbook, 2nd Edition, Satas and Tracton, Marcel Dekker, Inc., 2001 also which is incorporated by reference herein in its entirety. Desirably, the processing equipment includes a chill roll for increasing the speed with which the resultant magnetic composition, including at least the magnetic material and a thermoplastic binder, cools and sets. This is advantageous for more rapidly processing the resultant composition into rolls or sheets, for instance.

Line speeds may vary anywhere up to 500 feet per minute or higher. Previous methods, in contrast, allowed line speeds of only about 40-80 feet per minute. The present invention thus allows line speeds that are much faster than currently used methods. The line speed may be limited by the capacity of the extruder or other application equipment employed in the present method, as well as by the type and size of the die, nozzle, or other application head employed, the pressure used, the viscosity of the magnetic composition, and the temperature of application as is known to those of ordinary skill in the art.

Any method which allows the direct application of the thermoplastic, magnetic composition at an elevated temperature when it is iiia pliable or when it is in its plastic form to the printable substrate may be employed herein. Using the method of the present invention, the magnetic thermoplastic composition can be directly adhered to the desired substrate in any desired shape or form without the need for an additional adhesive layer. Thus, the resultant magnetic layer is both formed and joined to the printable substrate layer in a unitary or single process.

Previous methods, in contrast, require the formation of the magnetic layer, the cutting of the magnetic layer, and then bonding the magnetic layer to the substrate through the use of an additional adhesive layer to form the magnetic assembly which is thus done using multiple processes. The magnetic layer is supplied either in roll form, or in pre-cut form in their desired shapes as required by the purposes for which the magnetic layer is to serve and then bonded to the pintable substrate layer. The present invention, in contrast, allows the formation of the entire magnetic assembly in one process. Thus, the present invention provides a more efficient process over previous methods.

Using the method of the present invention, the mixture of binder and magnetic material is applied to a printable substrate at an elevated temperature wherein the thermoplastic binder is in a pliable or plastic form.

In some embodiments, the magnetic compositions according to the present invention can be formed into the magnetic layer in final form at temperatures sufficient to provide adequate wetting and adhesion between the magnetic composition and the printable substrate, without the use of an adhesive layer. Of course, the adhesion will also depend on the binder composition selected as well as the type of printable substrate employed. Some binder compositions will provide better adhesion than others and some will exhibit less adhesion, particularly if the substrate to be bonded to is difficult, as in the case of heavily coated or lacquered paper, for example. Thus, for some compositions and/or printable substrates, it may be beneficial to add an adhesive layer.

The substrate to which the magnetic composition may be joined using the process of the present invention may be any suitable printable substrate, including, for example, paper and paper products, pasteboard, plastic or polymeric materials, metal, release liners such as silicone release liner, textiles or fabrics, and so forth. Combinations of any of the substrates may also be employed. In some embodiments, a release liner may be employed in combination with another printable substrate, one on each side of the magnetic layer, for instance. The magnetic assembly which includes the printable substrate and the magnetic layer may then be removed from the release liner at the point of use.

The application temperature required may depend on numerous factors including the melting temperature of the thermoplastic binder, the viscosity of the resultant magnetic composition, and so forth. The melting temperature and viscosity may vary depending not only on the type of binder used, but on the various other ingredients which may be employed in the magnetic composition as described above. The higher the viscosity or melting temperature, the higher the temperature that may be required to successfully apply the magnetic composition. This of course also depends on the application equipment being employed. In general, thermoplastic materials are applied at temperatures of about 275° F. to about 375° F. (about 135° C. to about 190° C.), although some may be applied at higher or lower temperatures. For instance, very low viscosity thermoplastics may be applied at temperatures of as low as about 190° F. (about 90° C.). Some may be applied at temperatures as high as about 400° F. (about 205° C.), or higher, for instance polyamide materials are often applied at temperatures of about 400° F. Temperatures used, can even exceed 650° F., however. However, for most thermoplastic materials higher temperatures lead to more rapid degradation of the material. An often used application temperature range is about 325° F. to about 375° F. (about 160° C. to about 190° C.), with 350° F. (about 175° C.) being very common. In one embodiment of the present invention, polypropylene is used and may be applied at temperatures of over 400° F. (205° C.). Yet, using extrusion techniques polyethylene is commonly extruded at above 600° F. (306° C.) at high speeds.

The temperature should be sufficient to lower the viscosity of the thermoplastic material to allow the thermoplastic material to sufficiently adhere to the printable substrate. This may involve penetration into, or "wet out" of the substrate surface to which it is being applied. The thermoplastic material must be sufficiently adhered to the substrate so that delamination from the substrates does not occur.

Using the method of the present invention, the resultant magnetic composition may be advantageously applied in a thin layer of about 0.002 inches to about 0.030 inches (about 50μ to about 765μ; about 2 mils to about 30 mils), suitably about 0.002 inches to about 0.020 inches (about 50μ, to about 510μ; about 2 mils to about 20 mils) and most suitably about 0.002 inches to about 0.012 inches (about 50μ to about 305μ; about 2 mils to about 12 mils) thick. The present invention allows for application of a thinner layer of the binder/magnetic mixture. Previous extrusion and calendering methods, in contrast, did not allow for magnetic layers of less than about 4 mils to about 8 mils, and often more than 10 mils.

In one embodiment of the present invention, a ribbon of the magnetic composition is applied at an elevated temperature in a plastic state to a printable substrate. The ribbon may be applied to the substrate so that it is dimensionally coextensive with the printable substrate, i.e. the same length and width, or it may be applied to the substrate in discrete, preselected areas only. Furthermore, several ribbons may be applied to the substrate simultaneously, and they may be applied intermittently in a discontinuous pattern. The application line may be equipped such that pressure is applied to the ribbon(s) to press the ribbon(s) into the printable substrate. For instance, a chill roll may be employed for this purpose.

The surface of the ribbon may also be contacted by a magnetizing roll which smooths, cools and magnetizes the ribbon(s). When this is done while the ribbon is still fluid, it provides an enhanced magnetic effect known as alignment. The ribbon may be applied at a thickness of between about 0.002 inches and to about 0.020 inches (about 50μ to about 510μ).

In broad terms, the method of the present invention allows the magnetic composition to be formed and applied directly to the printable substrate in a single, unitary process. The width, thickness and length of the magnetic layer may be individually tailored to any desired size, and may be designed to cover all of the printable substrate being therefore applied generally dimensionally coextensive with the printable substrate, or may be applied to cover only some discrete portion of the substrate. Furthermore, it may be applied in a patterned form such as by using the silicone rubberized roll as described above (e.g. flexopress).

Furthermore, the magnetic composition may be formed and affixed to the printable substrate in a finished form substantially simultaneously. The thickness and width, or the thickness, width and length may be in their final fixed form. As used herein, the term "substantially simultaneously" may be used to indicate that it is occurring during a single process of manufacture.

The magnetic composition may be fully magnetized during the manufacturing process by providing a magnetic field on the line the entire width of the web after application of the magnetic composition to the printable substrate. The magnetization step may be optionally included after printing, or after formation of the article to its desirable size and shape by cutting, stamping or punching as described below.

In addition, the magnetizing step may be carried out while the thermoplastic binder is at an elevated temperature. This results in an alignment of the magnetic particles with a significant increase in the magnetic strength of the article as compared to the same article magnetized at ambient temperature. See Sawa 4022701 and Ito 6190513.

Optionally, indicia, i.e. printed matter, may be applied to the printable substrate prior to joining with the magnetic layer, or it may be printed after it has been joined with the magnetic layer. For ease of production, it may be desirable to print after the magnetic material has been joined to the printable substrate. However, no print need be applied to the printable substrate. For instance, in the case of magnetic note pads, no print may be applied. This allows the end user to apply their own notes and reminders to individual sheets of paper.

Once printed matter has been applied to the printable substrate, lacquers, films or other protective surfaces which also improve the appearance of the now printed substrate, may be provided on the surface of the printed substrate. These or similar materials may also be applied to the exposed surface of the magnetized layer to prevent unintended sticking or blocking of the combined article to itself or other substrates if necessary.

Once the entire magnetic assembly has been produced in roll or sheet form, the desired shapes may be cut, punched, stamped, or so forth from the assembly, either at the point of manufacture of the magnetic material, or by those to which the magnetic assembly is supplied as desired. Laser cutting is one example of a method by which various articles may be formed from the sheet or web.

While the present invention does not have the requirement that an adhesion promoting layer be applied between the magnetic layer and the printable substrate, in some embodiments it may be advantageous to add an adhesion promoting layer in order to improve adhesion between the magnetic layer and the printable substrate layer. It may, for example, be desirable to apply an adhesive composition, a primer composition, a tie layer, or some such other adhesion promoting composition.

There is no limitation as to the type of adhesive composition which may be employed and both thermoplastic and water-based compositions find utility herein, as well as reactive systems including radiation curing systems, moisture curing systems, catalytically induced reactive systems, and so forth.

There is no limitation as to the type of adhesive composition which may be employed and both thermoplastic and water-based compositions find utility herein, as well as reactive systems including radiation curing systems, moisture curing systems, catalytically induced reactive systems, and so forth.

Adhesive systems typically include at least one polymer, although this is not necessarily a requirement. Adhesive systems also include various other ingredients depending on the type of adhesive system. Such other ingredients include, but are not limited to, tackifying resins, plasticizers, waxes, antioxidants, as well as other additives known to those of ordinary skill in the art.

Polymers useful in thermoplastic adhesives include, but are not limited to, polyolefins including polyethylene and polypropylene, polyamides, polyurethanes, polyesters, polyacrylates, elastomeric block copolymers, and any copolymers and terpolymers thereof. Ethylene vinyl acetate, ethylene methyl acrylate, ethylene-n-butyl acrylate, and so forth, are commonly employed copolymers of ethylene, and homopolymers of ethylene and propylene are commonly employed in thermoplastic adhesives as well. Another class or ethylene copolymers include those referred to in the art as interpolymers of ethylene having at least one $C_3$ to $C_{20}$ alphaolefin.

Thermoplastic pressure sensitive adhesives find utility herein and commonly incorporate styrenic block copolymers such as styrene-isoprene-styrene, styrene-butadiene-styrene, styrene-ethylene/propylene-styrene, styrene-ethylene/butylenes-styrene, and so forth.

Water based pressure sensitive adhesives may also find utility herein. Such adhesives commonly incorporate polyacrylic polymers such as styrene-acrylic copolymer, vinyl-acrylic, vinyl ester/vinyl acetate/acrylic; ethylene vinyl acetates, polyurethanes; polyurethane-acrylic hybrids; styrene-butadiene rubbers; polychloroprenes; acrylonitrile-butadiene-styrene; polyisoprenes; polyisobutylene; polyurea; natural latex; polysaccharides; gum resins; polyvinyl alcohols; and combinations thereof.

Polyurethanes in both reactive and non-reactive types as well as both thermoplastic and water-based, may be employed herein.

The above lists are not exhaustive and are intended for illustrative purposes only. They are in no way intended as any limitation on the scope of the present invention. One of ordinary skill in the art would know that there is an endless array of adhesive compositions which may find utility herein.

Primer compositions may be employed in the present invention to promote adhesion between the magnetic layer and the printable substrate layer. Examples of primer compositions include, but are not limited to, aqueous polyurethane dispersions in combination with at least one crosslinking agent such as an isocyanate, for example. Isocyanate and polyisocyanate based primer compositions find utility in combination with a variety of polymer types including polyurethanes, polyamides, polyethers, and so forth. Isocyanates and polyisocyanates are well known for use in primer compositions.

Other tie layer compositions may also be employed. A tie layer may refer to a composition which is alike in nature to the polymeric binder in the magnetic composition, for example, although this need not be the case.

It is important to note that the printable substrate layer may be something that can be written or printed on by the end user, or it may already come with printed matter on it.

The methods of applying the adhesion promoting layer include both pre-application of the adhesive to the printable substrate layer, as well as simultaneous, or substantially simultaneous application of the adhesion promoting layer and the magnetic layer to the printable substrate layer.

One method of applying the magnetic layer and the adhesion promoting layer to the printable substrate layer includes coextrusion. Coextrusion typically involves the use of one die head wherein the magnetic layer and the adhesion promoting layer exit a single die head and are applied to the printable substrate at the same time. In this embodiment, it may be advantageous to employ a thermoplastic composition as the adhesion promoting layer.

Alternatively, a single die head may be employed in combination with a spray nozzle, either inside the die head, or just outside the exit port. In the latter case, the adhesion promoting composition may be applied to the magnetic layer right as it exits from the die head while the magnetic layer is still at an elevated temperature. Both layers then may be applied at substantially the same time to the printable substrate layer. If a spray nozzle is employed, then water based or other solvent based compositions may be employed because an elevated temperature may not be required for application.

Another method of in-line application involves the use of two die heads. Employing this type of application, the adhesion promoting layer may be applied at a time which is somewhat prior to application of the magnetic layer. For web-type equipment, this may also be described in terms of distance and the adhesion promoting layer may be applied inches or feet before the magnetic layer.

The adhesion promoting layer may also be pre-applied to the printable substrate, and then the magnetic layer subsequently applied at an elevated temperature to the surface of the printable substrate which includes the adhesion promoting layer.

Some types of adhesion promoting layers may require an additional release liner to prevent self adhesion of the now treated printable substrate layer to itself.

Figure 1A:
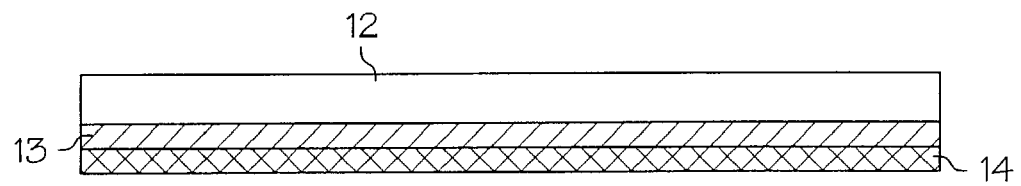
FIG. 1a illustrates the magnetic assembly of FIG. 1 further having an adhesion promoting layer.

Turning now to the figures, FIG. 1 represents generally at 10, a magnetic assembly according to the present invention. Magnetic layer 12 is joined to a printable substrate layer 14 without the use of an additional adhesive layer. Optionally, as shown in FIG. 1a, an adhesion promoting layer 13 may be incorporated to improve the adhesion between the magnetic layer 12 and the printable substrate layer 14. The adhesion promoting layer may also be incorporated through the use of an in-line process as described in the present invention.

Figure 2:
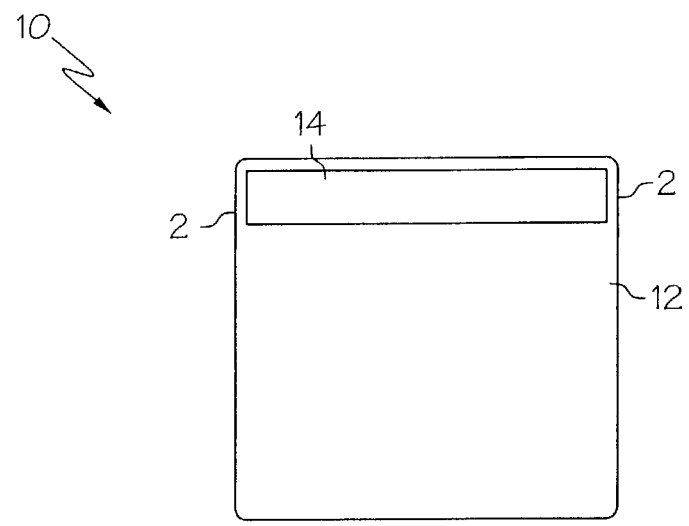
FIG. 2 illustrates an embodiment of the present invention in which the magnetic layer is found in a discrete location on a printable substrate layer.

FIG. 2 illustrates generally at 10, one embodiment of the present invention in which the magnetic layer 14 is applied in a discrete area of the printable substrate 12.

Figure 3:
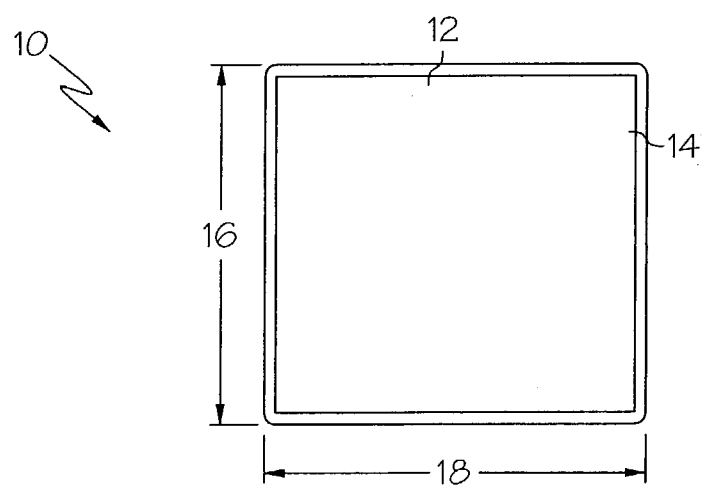
FIG. 3 illustrates an embodiment in which the magnetic layer is substantially equal in length and width to the printable substrate layer.

FIG. 3 shows generally at 10, an alternative embodiment of the magnetic assembly of the present invention in which the magnetic layer 14 is shown substantially coextensive with the printable substrate layer 12 both in length 16 and width 18.

Figure 4A:
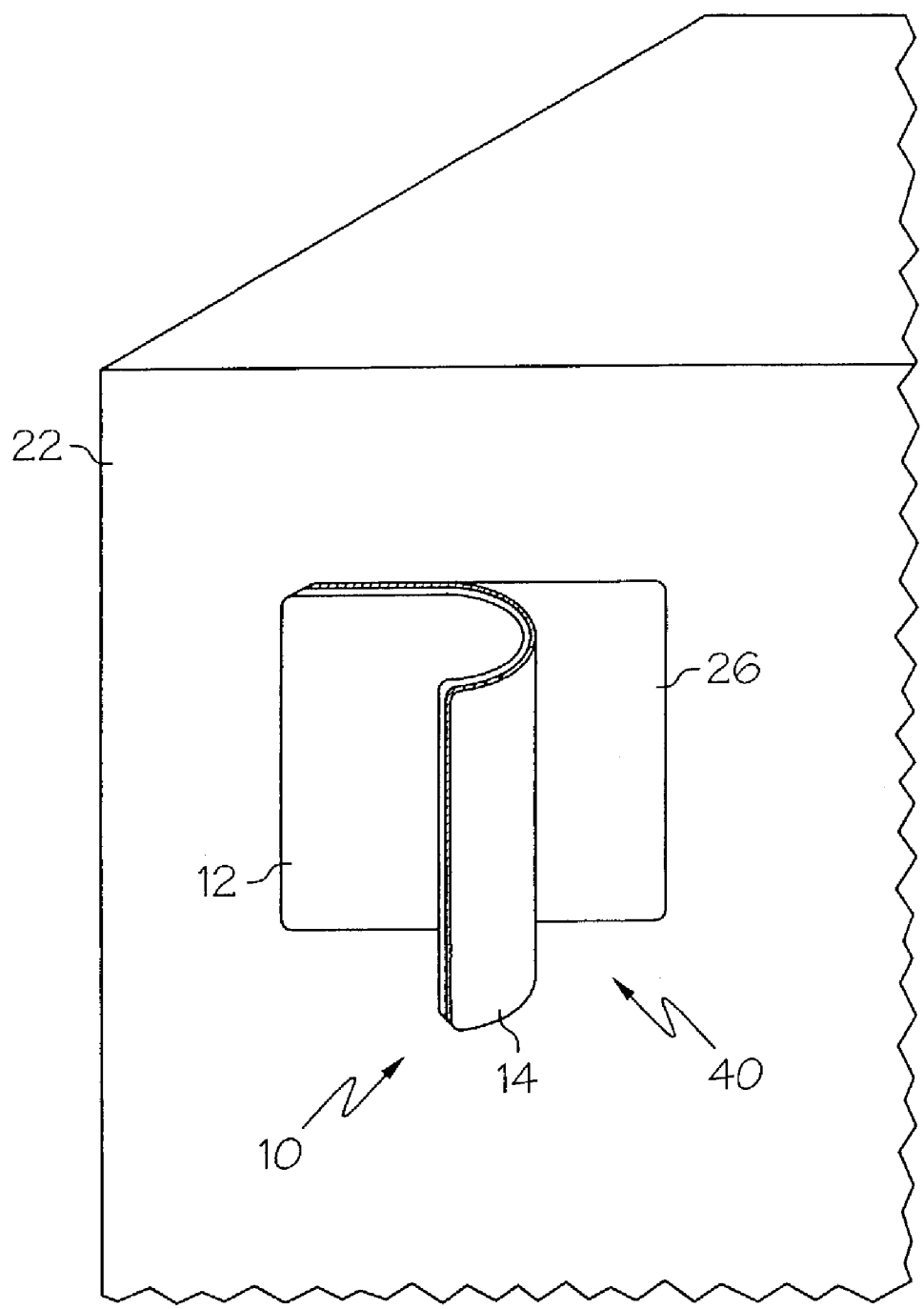
FIG. 4a is a perspective view of the magnetic label assembly of the present invention shown provided on an article.

FIG. 4a illustrates generally at 10 a magnetic label assembly of the present invention with the printable substrate layer 12 joined to a magnetic layer 14. The magnetic layer is further attached to a release liner 26. This may be accomplished using any means known in the art such as through the use of a removable pressure sensitive adhesive, such as a removable hot melt adhesive, or dry release adhesive. Furthermore, the entire assembly of printable substrate layer 12, magnetic layer 14 and release liner 26 may be further adhered to an article such as a package, cup, book, magazine or other such article 22 through the use of a pressure sensitive or dry release adhesive (not shown). The magnetic assembly 10 may then be used in commerce for advertising or promotional purposes.

Figure 4B:
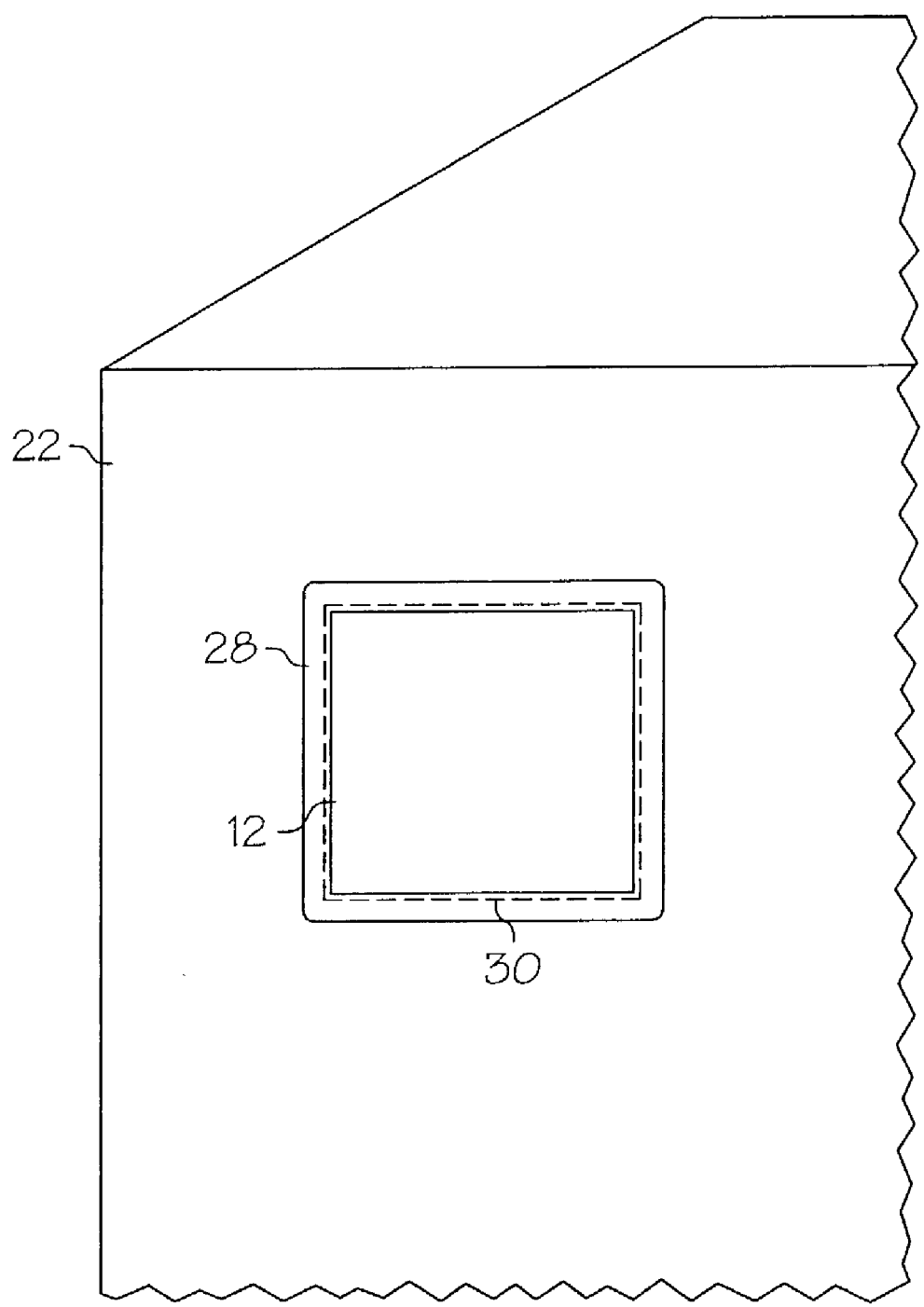
FIG. 4b is an alternative embodiment to that shown in FIG. 4a in which the magnetic assembly is further provided with an overlaminate.

FIG. 4b shows an alternative embodiment in which the printable substrate layer 12 further has an overlaminate 30 which extends over the printable substrate layer 12 which is dimensionally substantially equivalent in at least length and width to the magnetic layer (not shown). In this embodiment, no adhesive is required between the magnetic layer and the release liner or the release liner and the article 22. The overlaminate has perforations which are substantially dimensionally equivalent in length and width to the printable substrate layer 12 and the magnetic layer (not shown) for easy removal of the magnetic assembly which includes the printable substrate layer and the magnetic layer. Embodiments such as these are further discussed in relation to FIGS. 11-13 described in detail below.

Figure 4C:
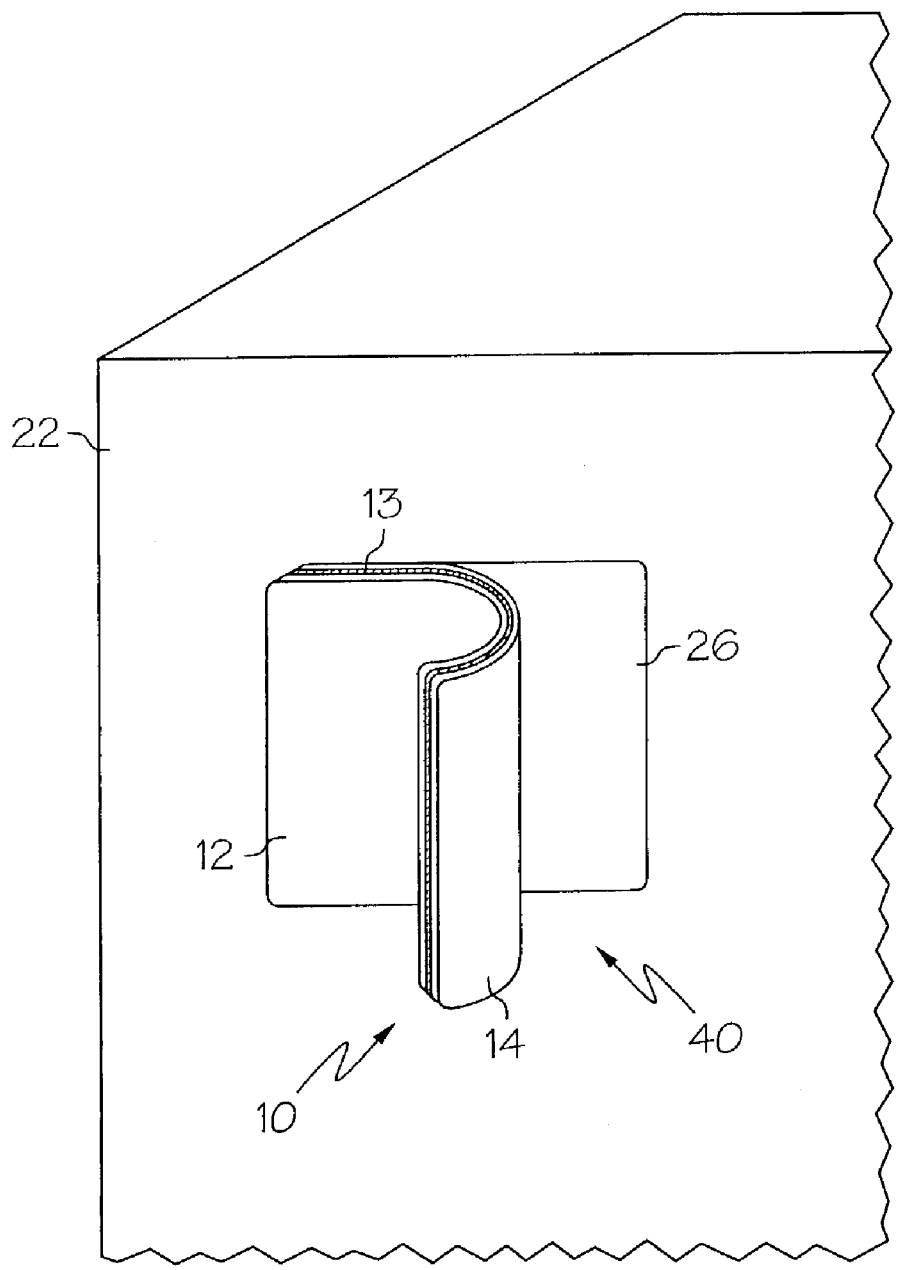
FIG. 4c illustrates an alternative embodiment to that shown in FIG. 4a in which an adhesion promoting layer is employed.

FIG. 4c represents an alternative embodiment in which there is an additional (adhesion promoting layer 13 between the printable substrate layer 12 and the magnetic layer 14. The adhesive promoting layer may be applied to the magnetic in a variety of ways which are discussed in detail above, one method including coextrusion of the magnetic layer 14 and the adhesion promoting layer 13, both of which may then be applied in-line to the printable substrate layer 12. If a coextrusion technique is employed, it may be desirable to employ a thermoplastic adhesion promoting composition. However, other techniques of application may be employed. For example, a spray nozzle may be employed to apply an adhesion promoting composition as the magnetic substrate layer exits the die of the application equipment whether it be slot die, extrusion, or some other technique. In this latter example, a water based or solvent based adhesion promoting composition may be employed as well.

Such techniques are described, for example, in U.S. Pat. Nos. 4,056,344 and 4,093,693 both of which are incorporated by reference herein in their entirety.

Alternatively, the adhesion promoting layer may be pre-applied to the printable substrate layer. If the adhesion promoting layer is tacky or sticky, such as with a pressure sensitive adhesive, for example, a release liner may be employed in this latter case. These examples are intended for illustrative purposes only, and are by no means exhaustive or intended as limiting on the present invention.

The adhesion promoting layer 13 and methods of application are discussed in more detail above.

An optional embodiment may have the magnetic assembly 10 packaged in a thin film for instance, such as a polyolefin or polyolefin copolymer based film, saran, mylar, or some such film. An application similar to this is referred to in the bookbinding industry or pressure sensitive adhesive industry as magazine tipping wherein advertisements or samples are temporarily adhered to a magazine or book. Once removed from the package, book, magazine or so forth, the magnetic assembly 10 may be self adhered to a magnetic surface such as a refrigerator or filing cabinet, for instance.

Figure 5:
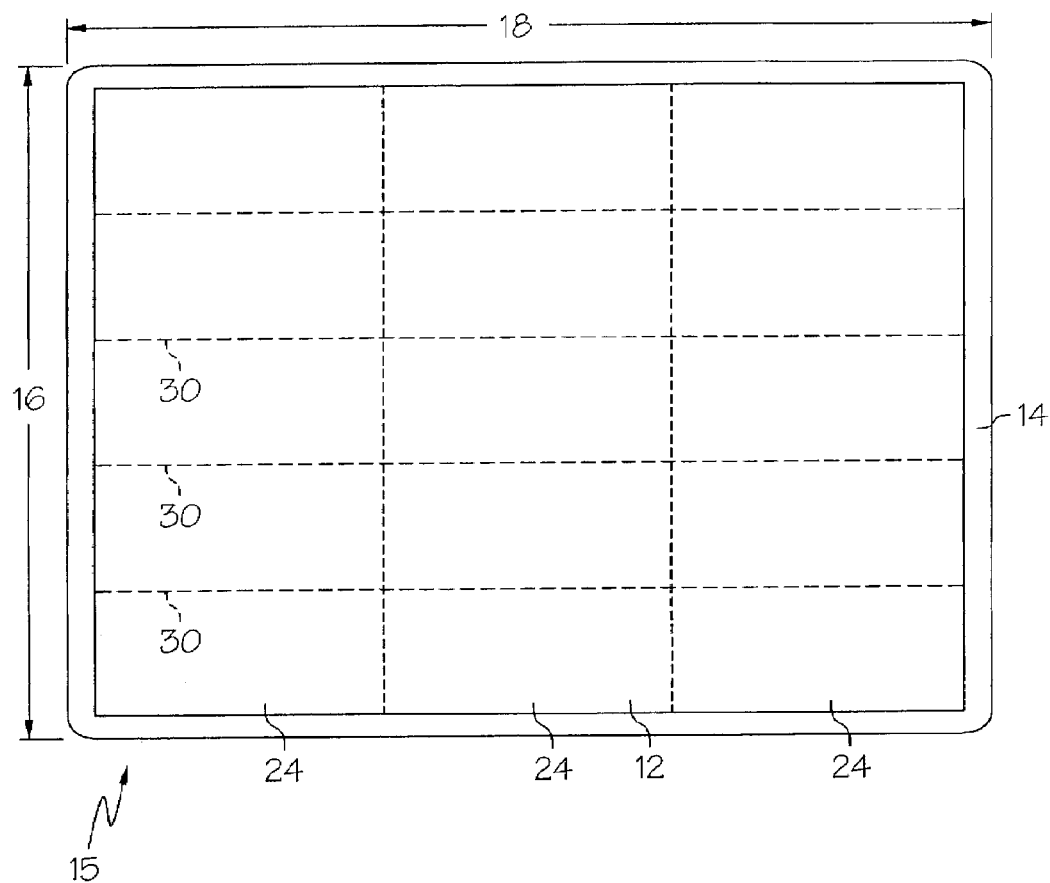
FIG. 5 illustrates an embodiment of the magnetic assembly of the present invention in which individual pieces may be produced from a sheet or web material.

FIG. 5 illustrates generally at 15 a magnetic assembly of the present invention prior to forming the individual pieces from the sheet or web in which the magnetic layer 14 is shown substantially coextensive in length 16 and width 18 with the printable substrate layer 12. In this embodiment, individual pieces such as labels, business cards, and so forth, for example, have been printed on printable substrate layer 12 (print not shown) in a sheet form. The individual magnetic pieces 24 may then be later cut, stamped, punched and so forth out of the sheet at the perforations 26 forming individual magnetic pieces 24.

Figure 6:
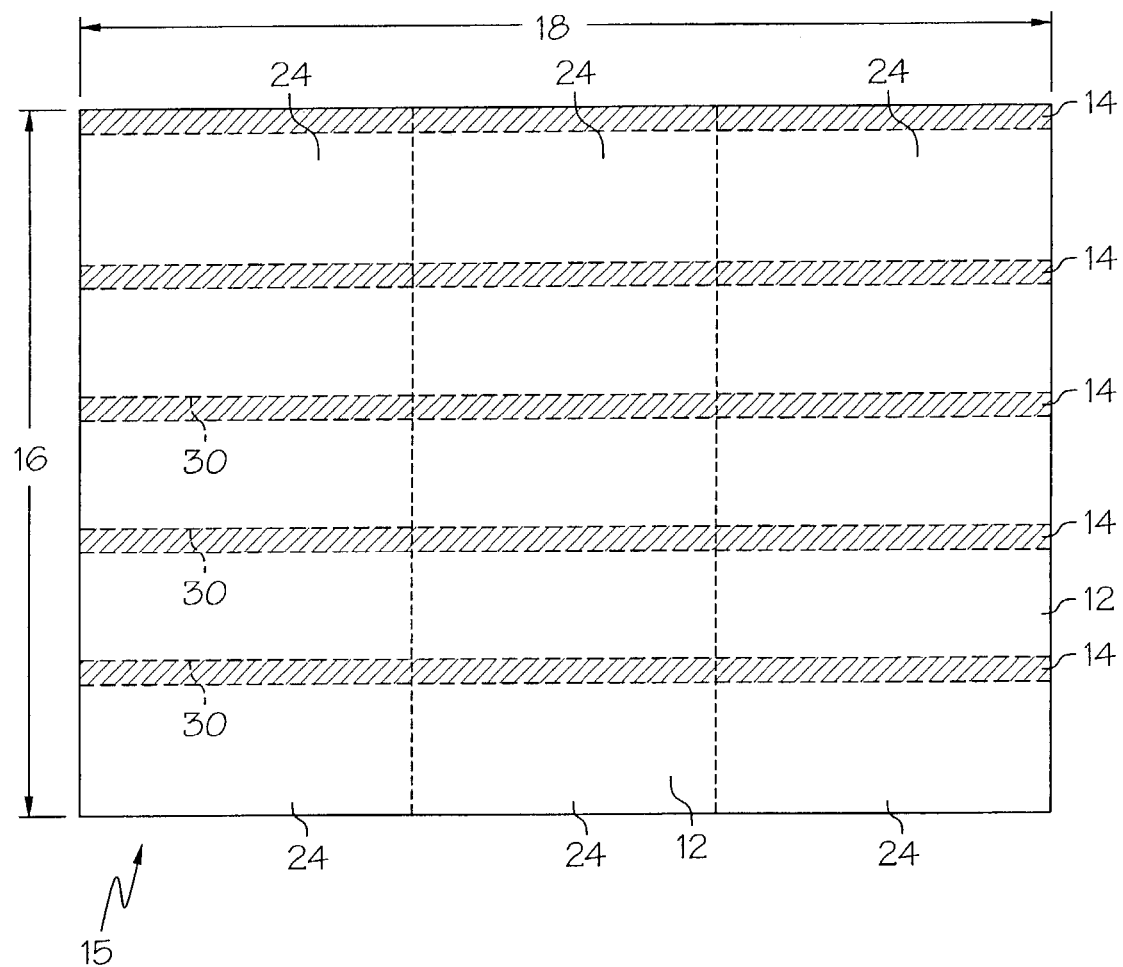
FIG. 6 illustrates an alternative embodiment as that shown in FIG. 5 in which the magnetic layer is located in discrete areas along the web or sheet of printable substrate.

FIG. 6 illustrates an alternative embodiment of that shown in FIG. 5 in which the magnetic layer 14 has been applied in ribbons and pressed in discrete areas only on the printable substrate layer 12. In this embodiment, a strip of magnetic layer 14 is shown at the top of what will be each individual piece 24 when cut at the perforations 26.

Figure 7:
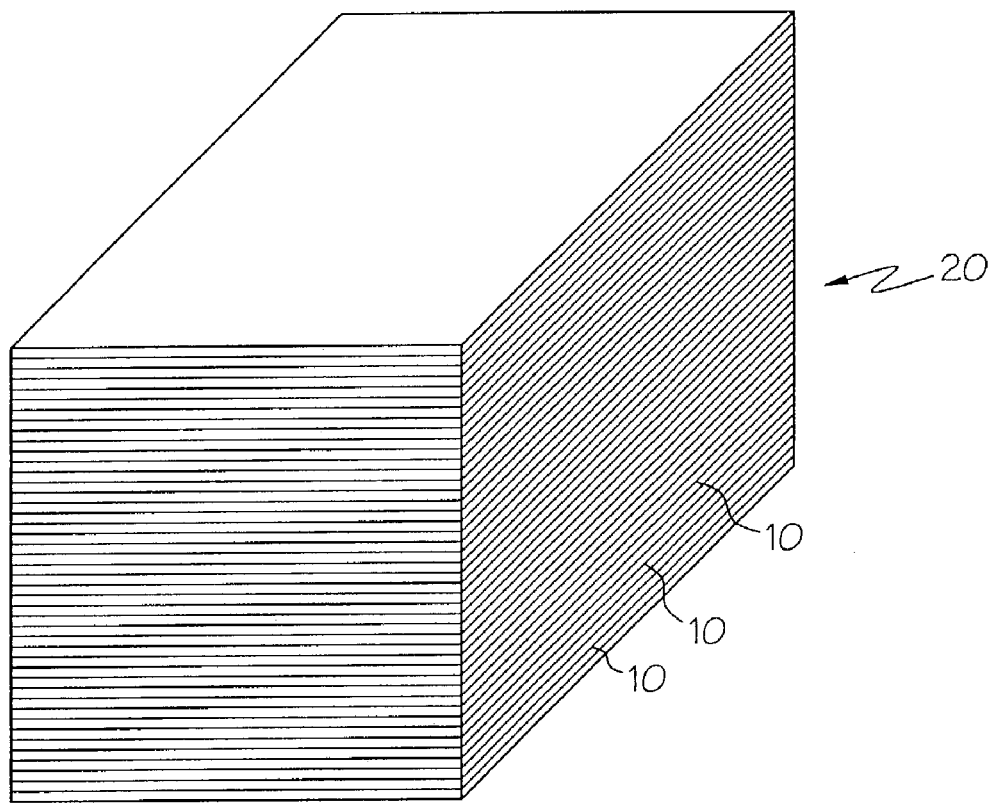
FIG. 7 is a perspective view of an embodiment of the present invention in showing a collection of a plurality of individual magnetic assemblies.
Figure 8:
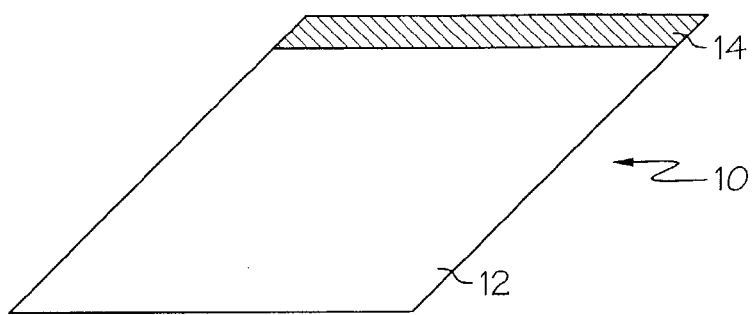
FIG. 8 illustrates one embodiment of the magnetic assembly of the present invention.
Figure 9:
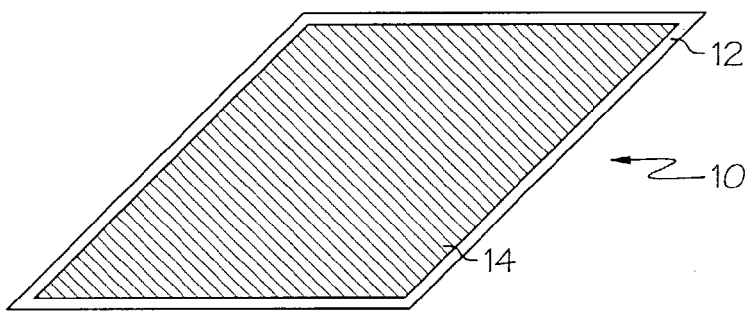
FIG. 9 illustrates an alternative embodiment of the magnetic assembly of the present invention.
Figure 10:
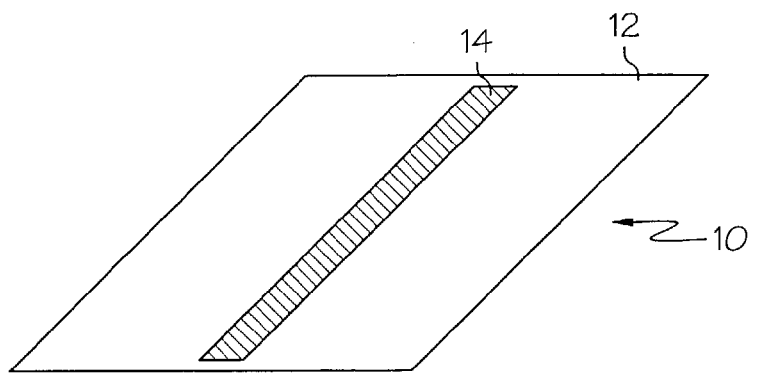
FIG. 10 illustrates another alternative embodiment of the magnetic assembly of the present invention.

Optionally, the individual pieces may be bound together in a process similar to what is referred to in the industry as "perfect" binding. Using this process, the individual pieces or sheets of printable substrate having the magnetic layer are stacked in a block or arranged in a pad format, held in a clamp to form a block, and then bound together using an adhesive. The adhesive is applied to one side of the stack or pad, which also may be referred to as the "backbone" of the block. A cover may be adhered to the backbone to prevent the adhesive from adhering in the case of a pressure sensitive adhesive. If a non-pressure sensitive adhesive is employed, and it is not tacky, then no cover may be necessary. The adhesive may be applied by spraying, rolling or any other means known in the art. An alternative to employing an adhesive is to stack the individual magnetic pieces in a stack, block or pad, and then shrink wrapping them together. FIG. 7 illustrates generally at 20, a stack or block of individual magnetic assemblies 10. FIGS. 8, 9 and 10 illustrate various embodiments in which magnetic layer 14 is applied to the printable substrate 12, in this embodiment, blank paper. Of course, the paper can be personalized, or have messages printed on it, and so forth.

Figure 11:
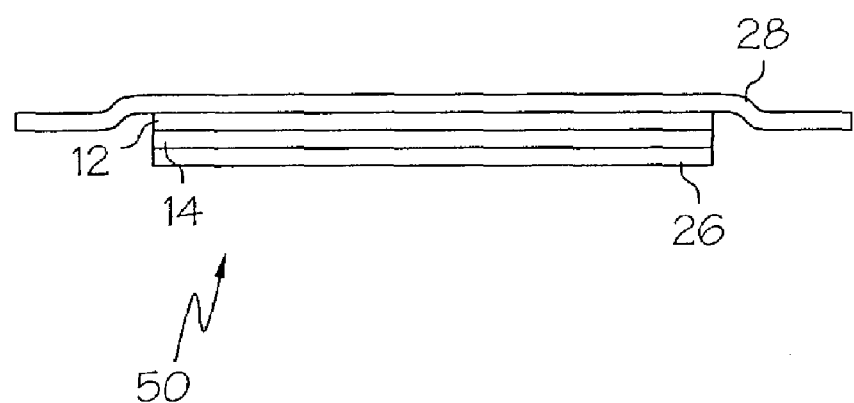
FIG. 11 is a sideview of one embodiment of the magnetic assembly of the present invention further including a release liner and an overlaminate.
Figure 12:
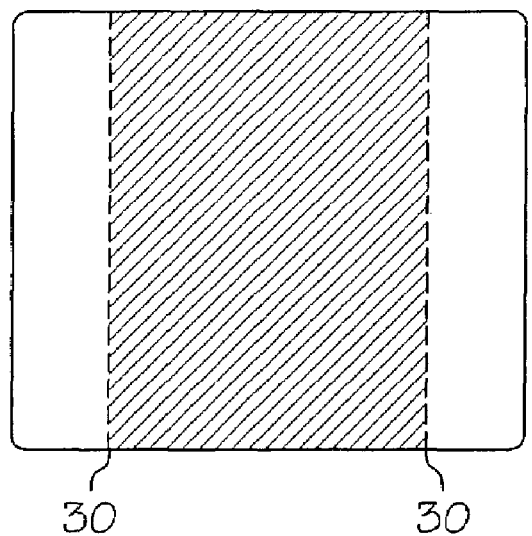
FIG. 12 is a top down view of the embodiment shown in FIG. 11 in which the overlaminate further includes perforations.

FIG. 11 illustrates generally at 50 a cross-sectional view of an alternative embodiment of the magnetic label assembly produced according to the present invention. Magnetic layer 14 is joined to printable substrate layer 12 without the use of an additional adhesive layer. Magnetic layer 14 a release liner 26 is employed in combination with and next to the magnetic layer 14. In this instance, an overlaminate 28 is employed to hold the assembly together. Overlaminate 28 has perforations 30 which maybe employed to remove the magnetic label assembly 10 which includes the printable substrate layer 12 and the magnetic layer 14, from the release liner 26. In this case, no adhesive is employed to hold the release liner 26 to the magnetic layer 14. FIG. 12 illustrates a top down view showing the perforations 30 in the overlaminate 28. These can be produced in sheet form, for instance, as shown generally at 60 in FIG. 13.

Figure 13:
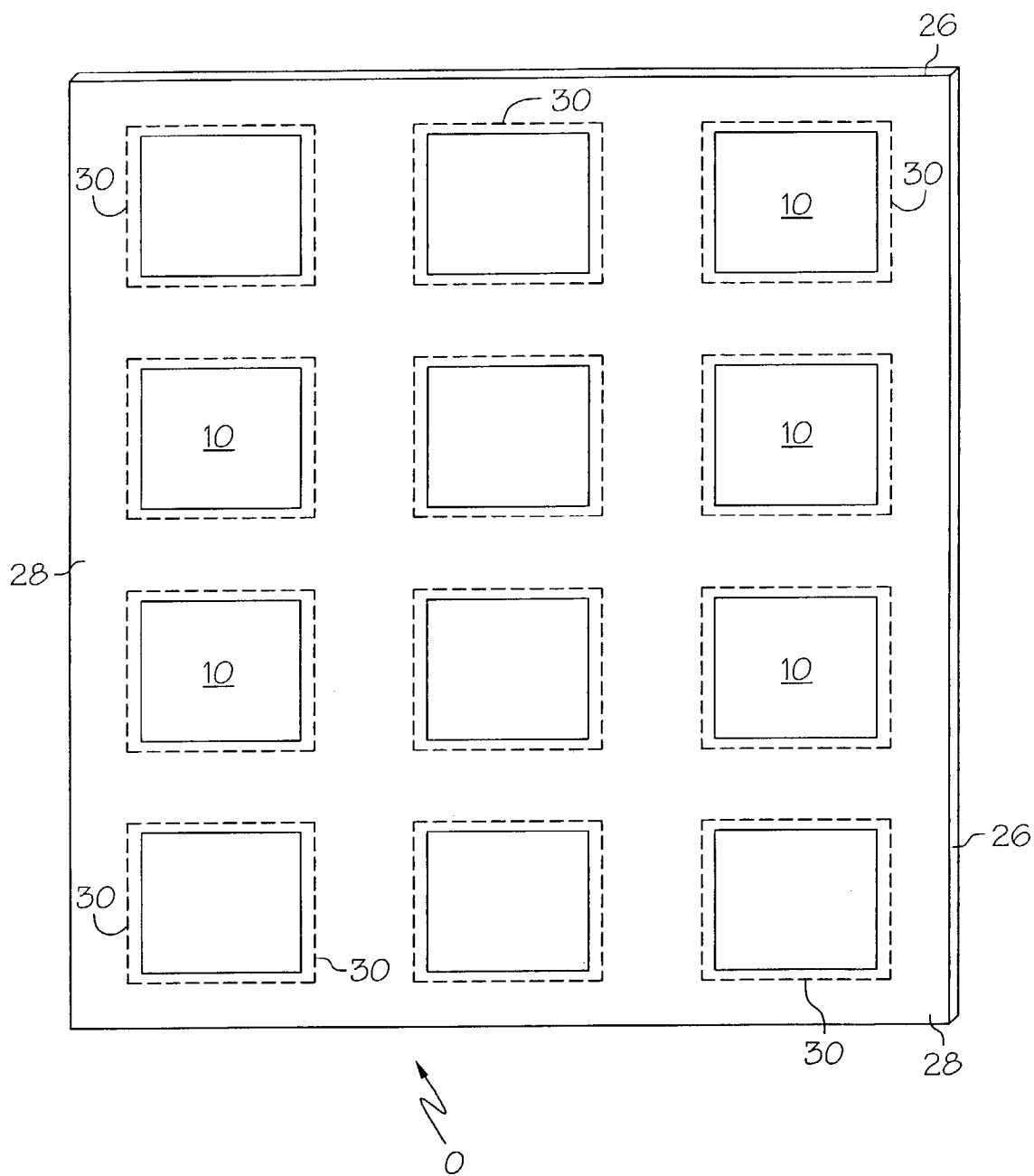
FIG. 13 shows the embodiment described in FIGS. 11 and 12 in sheet form.

The assembly as shown in FIGS. 11-13 is a four layer structure as shown cross-sectionally in FIG. 11. No adhesives are employed in this embodiment. The entire assembly includes a release liner 26, a magnetic layer 14, a printable substrate layer 12 and a clear over laminate 28.

Figure 14:
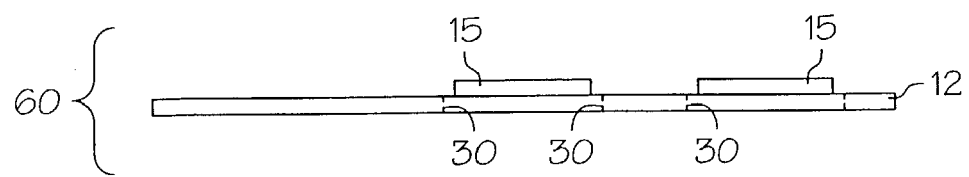
FIG. 14 is a sideview of an alternative embodiment of the magnetic assembly of the present invention.
Figure 15:
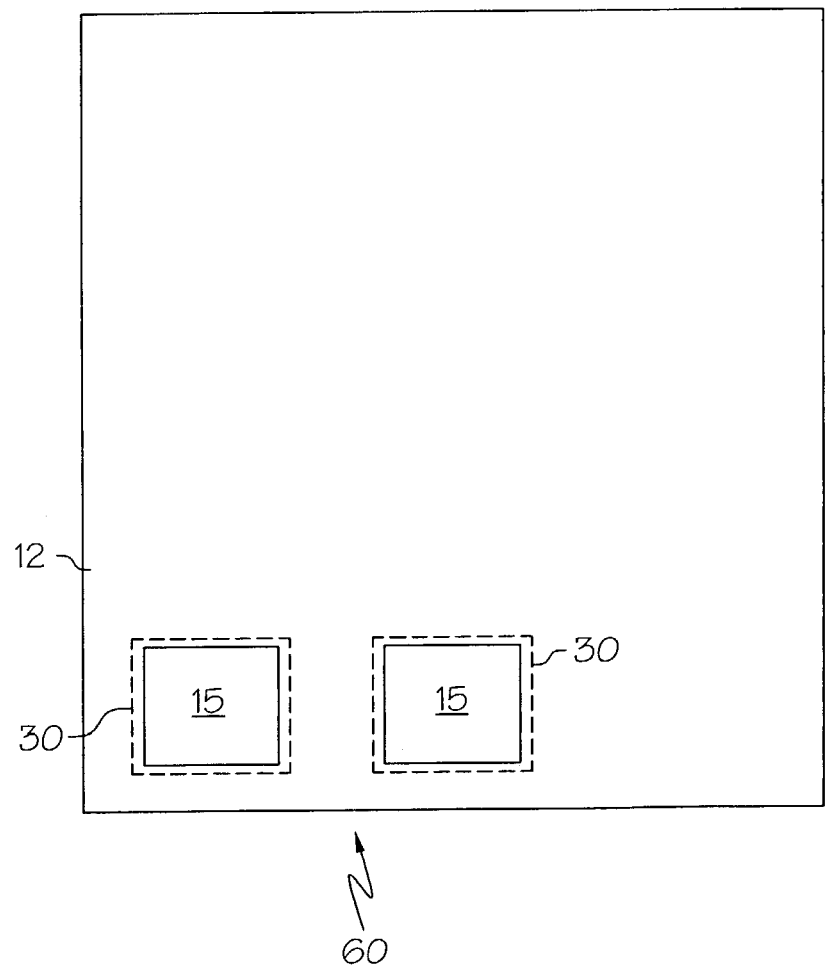
FIG. 15 is a top down view of the embodiment shown in FIG. 14.

FIG. 14 illustrates an alternative embodiment in which the magnetic layer 14 being applied in discreet individually sized pieces 15. This assembly is of a two-layer construction having only the printable substrate layer 12 and the magnetic layer 14. The printable substrate layer 12 has perforations 30 which coincide with each individual discreet magnetic piece 15 and allow each individual magnetic assembly 10 of the present invention which includes the printable substrate layer 12 and the magnetic layer 14 to be easily removed from the sheet 60. The magnetic-pieces 15 are directly adhered to the printable substrate layer 12. FIG. 15 illustrates a top down view of the embodiment of the magnetic sheet described in FIG. 14 showing perforations 30 in the printable substrate layer 12 which coincide with the individual magnetic piece 15 so as to provide easy removal.

The above disclosure is intended for illustrative purposes only and is not exhaustive. The embodiments described therein will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

The invention claimed is:

1. The method of forming a multi-layer magnetic assembly in-line, said multi-layer magnetic assembly consisting of a magnetic layer, an adhesion promoting layer, and a printable substrate layer, said method comprising the steps of:
    a) providing a hot melt magnetic composition, said hot melt magnetic composition comprising comprises about 80 wt-% to about 95 wt-% of at least one magnetic material and about 5 wt-% to about 20 wt-% of at least one thermoplastic material at an elevated temperature with an extruder;
    b) providing a printable substrate layer;
    c) providing an adhesion promoting layer on said printable substrate layer; and
    d) applying said hot melt magnetic composition at an elevated temperature directly to said printable substrate layer with a first slot die application head to form a magnetic layer having a thickness of about 50 microns to about 305 microns on said printable substrate layer, the adhesion promoting layer between said printable substrate layer and said magnetic layer.

2. A method of forming a magnetic assembly having at least one magnetic layer having dimensions of thickness, width and length, and at least one printable substrate layer having dimensions of thickness, width and length, the method comprising the steps of:
- a) providing a hot melt magnetic composition at an elevated temperature with an extruder, said magnetic hot melt composition comprising about 75 wt-% to about 95 wt-% of at least one magnetic material and about 5 wt-% to about 25 wt-% of at least one thermoplastic binder;
- b) providing a printable substrate layer selected from paper, paper products and pasteboard;
- c) providing an adhesion promoting layer on said printable substrate layer;
- d) applying said hot melt magnetic composition directly with a slot die head to said printable substrate layer to form a magnetic layer on said printable substrate layer, said magnetic layer having a thickness of about 50 microns to about 305 microns, said adhesion promoting layer between said printable substrate layer and said hot melt magnetic layer; and
- e) subjecting said magnetic assembly to a strong magnetic field sufficient to result in a permanent magnetic effectin the assembly.

3. The method of claim 2 wherein said adhesion promoting layer is an adhesive, a primer, a tie layer, or a mixture thereof.

4. The method of claim 2 wherein said adhesion promoting layer is a thermoplastic pressure sensitive adhesive or a water-based pressure sensitive adhesive.

5. The method of claim 3 wherein said adhesive comprises at least one polymer selected from the group consisting of polyolefins, polyesters, polyurethanes, polyamides, copolymers and terpolymers thereof.

6. The method of claim 2 wherein said adhesion promoting layer is thermoplastic, thermosetting, water based or solvent based.

7. The method of claim 2 wherein said adhesion promoting layer comprises at least one isocyanate or polyisocyanate and said magnetic composition comprises at least one polyurethane, polyamide or polyether.

8. The method of claim 2 wherein said magnetic composition is provided in pellet form.

9. The method of claim 2 wherein said thermoplastic binder comprises a polyolefin copolymer.

10. The method of claim 9 wherein said thermoplastic binder comprises an ethylene vinyl acetate copolymer. permanent magnetic effect in the assembly.

11. The method of claim 2 further comprising the step of forming said magnetic assembly into a plurality of magnetic sheet assemblies.

12. The method of claim 11 further comprising the step of layering the sheet assemblies together to form a stacked pad.

13. The method of claim 12 further comprising the step of binding said sheet assemblies together at one end.

14. The method of claim 2 wherein said adhesion promoting layer is provided on said printable substrate layer by applying an adhesion promoting composition said printable substrate layer in-line with said hot melt magnetic composition.

15. The method of claim 14 wherein said adhesion promoting layer is provided on said printable substrate layer in-line by coextruding said adhesion promoting composition with said hot melt magnetic composition.

16. The method of claim 15 wherein said adhesion promoting composition is applied using a second die head.

17. The method of claim 14 wherein said adhesion promoting composition is applied to said printable substrate layer substantially simultaneously with said hot melt magnetic composition.

18. The method of claim 2 wherein said magnetic hot melt composition comprises about 85% to about 95% of at least one magnetic material and about 5 wt-% to about 15 wt-% of at least one thermoplastic material.

19. The method of claim 2 wherein said adhesion promoting layer is pre-applied to said printable substrate layer.

* * * * *